Patented Dec. 25, 1923.

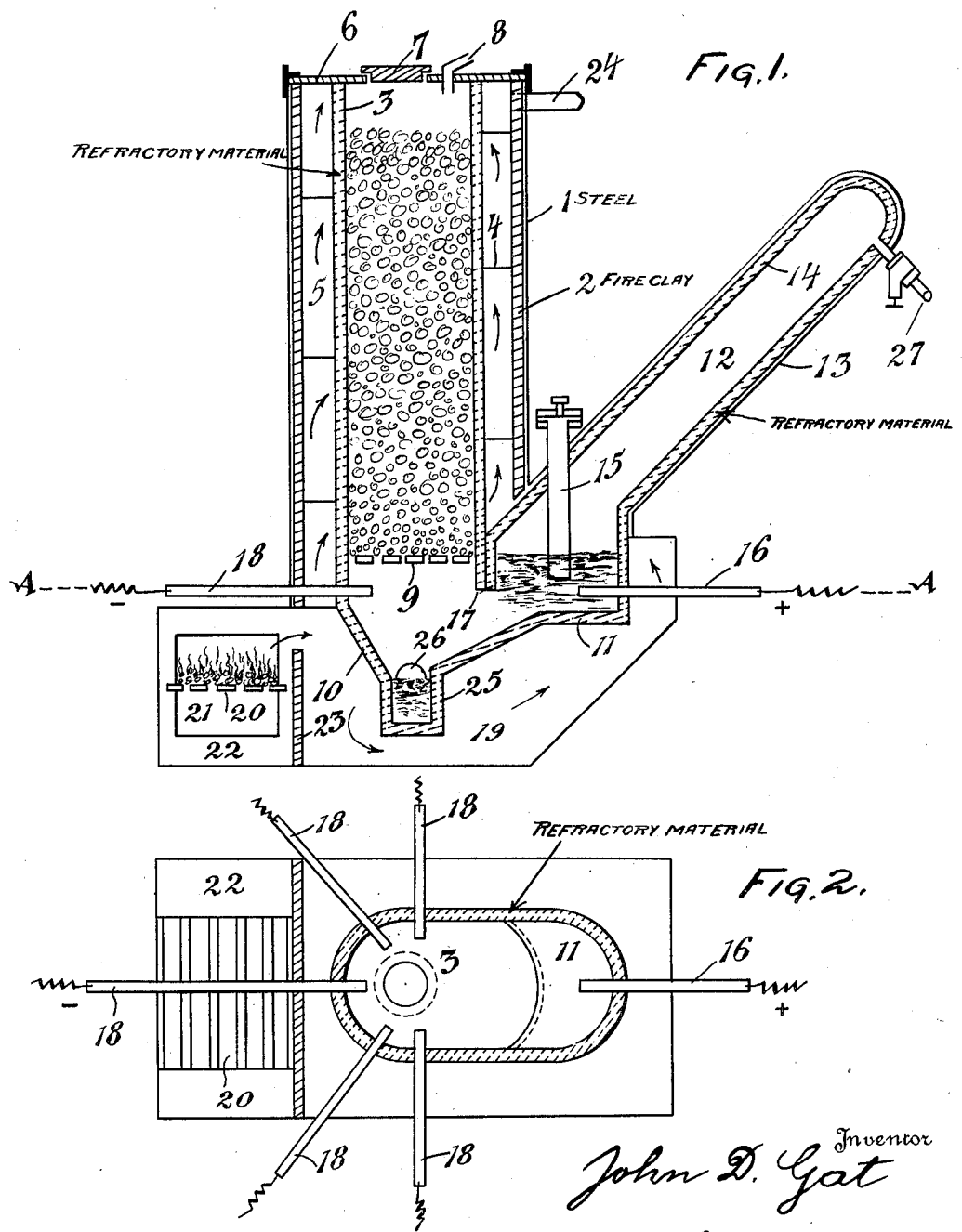

1,478,822

UNITED STATES PATENT OFFICE.

JOHN D. GAT, OF NORTH CANTON, OHIO.

METHOD OF AND APPARATUS FOR DECOMPOSING ORES.

Application filed February 2, 1921. Serial No. 441,927.

*To all whom it may concern:*

Be it known that I, JOHN D. GAT, a citizen of the United States of America, residing at North Canton, county of Stark, and State of Ohio, have invented a certain new and useful Method of and Apparatus for Decomposing Ores, of which the following is a specification.

This invention relates to improvements in the manufacture of metallic compounds and it particularly relates to the manufacture of metallic compounds, preferably metal oxides, from the silicates of the metallic bases by acting upon same with an alkali metal, the object of the invention being to manufacture metallic compounds of a high degree of purity in a more economical and efficient way.

By way of illustrating my invention I cite as an example the production of alumina from an aluminum silicate as for instance common clay, kaoline, orthoclase, spodumene, etc.

Up to now all the processes for the manufacture of aluminum start from pure aluminum oxide as a raw material. The requirements in regard to the purity of the applied aluminum oxide for this purpose are very strictly adhered to for the reason that all the impurities present in the aluminum oxide usually called alumina are found in the aluminum in the higher percentage than in the alumina itself.

The purification of alumina on a commercial scale is usually performed by dissolving it in alkali with subsequent precipitation by some reagent; a mineral, therefore, may be called an "aluminum ore" when it contains alumina in a state in which it can be easily affected by an alkaline solution, i. e., in free state. The use of other aluminum ores, as for instance of the immense deposits of aluminum silicates, for the production of pure alumina usually met with great difficulties. To introduce such aluminum silicates among "aluminum ores" a process is needed which starts with a very cheap chemical and produces by a series of simple and inexpensive operations not only alumina of a very high degree of purity, but also some other products having a ready market, these by-products paying a substantial part of the expenses of the production of the alumina.

Such a process is the subject of my invention, which I shall explain in connection with the accompanying drawing in which Figure 1 is a vertical longitudinal section showing in rather a diagrammatical way one form of apparatus suitable for the purpose. Figure 2 being a horizontal cross section on the line A—A of Figure 1.

The walls of a furnace are shown as formed of steelplates 1 lined on the inside with a wall 2 of insulating bricks, the remaining space between said wall and the shaft 3 being subdivided by baffle plates 4 to form a continuous flue 5.

The cover 6 closes both the flue and the shaft and is provided with a trap 7 and an exhaust pipe 8. In the lower part of shaft 3 a grate 9 is provided.

The shaft 3 is resting on a funnel-shaped sink 10 which extends at one side into basin 11 and carries a gas chamber 12, extending upwardly under an angle of 45°, superimposed upon said basin. This gas chamber 12 is formed by an outer shell 13, made for instance of steelplate or other suitable material, and an inside lining 14 made of silica bricks or other suitable material acting as an insulator to electricity and being sufficiently resistant to the chemicals further mentioned below. 15 indicates a feed pipe, suitably covered, reaching into the gas chamber 12 and terminating within the basin 11 shortly above the positive electrode 16. The double wall 17 separates shaft 3 and gas chamber 12 but as it terminates shortly above the rim of sink 10, shaft 3 and gas chamber 12 communicate with each other by way of this sink 10 and the basin 11.

In the same plane with electrode 16, one or a plurality of negative electrodes 18 are provided.

The funnel 10 is surrounded by a flue 19 as the passage way for the gases formed by the combustion of fuel upon grate 20, the fuel being introduced by door 21 and the ashes accumulating in pit 22. The bridge 100

23 separates the ashpit from flue 19 which at about the top of basin 11 opens into flue 5, from which the combustion gases finally escape through exit 24.

The stem 25 of the funnelshaped sink 10 serves as a reservoir for chemicals accumulating during the process and an exit 26 serves for their removal therefrom.

Gas chamber 12 finally is provided with a valve 27 for the withdrawal of gases generated by the process, or occasionally also for the introduction of certain gases into the gas chamber.

For the better understanding of my invention I shall describe how I proceed to put same into effect. Assuming that the apparatus described above is heated to a temperature of at least the melting point of sodium chloride, the apparatus is filled through the feed pipe to about one third of its height with a molten salt of an alkali metal, as for instance sodium chloride, or a mixture of sodium and potassium chloride, or a mixture of sodium chloride and calcium chloride, so that the molten salt acts as a liquid gas tight seal and separates the two compartments, the shaft 3 and the gas chamber 12 from each other; whereupon the electric current is switched on to start the electrolysis of the molten sodium chloride.

In case the sodium chloride is introduced in solid form into the apparatus it is either melted by the electric current, or by external heat, or by both these heating agents.

As soon as the electrolysis starts chlorine gas is generated at the electrode 16 and as valve 27 is closed the gas cannot escape from chamber 12 and pressure is created within the chamber 12, so that the level of the electrolyte will rise in the shaft 3 to about two-thirds of its height. The silicates to be decomposed, as for instance orthoclase is then charged through trap 7 in pieces of as uniform size as possible into shaft 3 and as they are heavier than the electrolyte they submerge in the electrolyte to finally rest on grate 9. If desirable, a flux may be added to the electrolyte for a double reason, i. e., to keep the same more readily in liquid form and furthermore because the reduction of the mineral charged into shaft 3 is accomplished more easily.

It is evident from Figure 2 that all the negative electrodes, at which metallic sodium is separated out are all within the area of shaft 3; the metallic sodium generated by the electrolysis therefore rises owing to its lower specfic gravity within the shaft 3. During its upward travel the sodium acts upon the silicate forming alkali metal oxides which combine with acid like $SiO_2$, or $Al_2O_3$ to fusible silicates and aluminates of alkali metals; these acids are left unreduced if the amount of other metal oxides in the silicate was enough to give the condition for the formation of sufficient alkali metal oxide, otherwise a flux is added to remedy the situation.

The reaction proceeds according to the following equation:

$$Al_2O_3 + SiO_2 + 2Fe_2O_3 + 12Na = \\ 2Na_3AlO_3 + Na_2SiO_3 + 4Fe + 2Na_2O.$$

These phenomena take place at a temperature of from about 1100–1200° C. and at this temperature the sodium silicate and sodium aluminate are liquid enough to be separated by gravity from undecomposed silicates which remain solid at this temperature and are supported by the grate; these other products accumulate at the bottom 20 of the sink 10 as a molten mass of sodium silicate and aluminate in which particles of reduced metals are suspended.

The separation of alumina from silica may be performed by simple and inexpensive means for inasmuch as sodium silicate and sodium aluminate are readily soluble in water, dissolving of the obtained products, washing and filtering furnish an easy way for separating silica and alumina from the rest of the undecomposed compounds of the silicate. As to the chemical situation the treatment of the aqueous solution of sodium aluminate and sodium silicate with carbonic dioxide gas, thereby precipitating aluminum hydroxide and silica, which can be subsequently acted upon with solvents, having a different effect upon each of the said substances, offers various convenient ways to perform the separation of aluminum and silica from each other. For instance the precipitate after washing it with water may be treated with a weak solution of sodium hydroxide of approximately 15° Be'=1,116 specific gravity, or with a weak solution of an acid, preferably hydrochloric acid; in both ways of treatment soluble aluminum compounds are formed which may be separated from the unchanged silica by filtering. In case an alkaline solution is used for dissolving the alumina, the latter may be precipitated again from the solution by means of carbon dioxide and the precipitated aluminum hydroxide filtered off, washed and calcined. In case a solution of weak hydrochloric acid is used for dissolving the aluminum hydroxide, the obtained aluminum chloride solution is evaporated to dryness and the mass being then calcined the desired alumina is obtained thereby.

From the foregoing it is evident that by means of my new process and apparatus, using only sodium chloride as a source of alkali metal and taking advantage of the combustion gases used for heating the apparatus as a source of carbon dioxide, the following compounds are obtained from the applied orthoclase: aluminum oxide in a high state of purity, sodium carbonate, potassium carbonate, silica contaminated only with traces of alumina, and chlorine gas of high concentration.

As already stated, I may apply other metals for the reduction of the silicate, as for instance any other alkali metal, and therefore I may apply any other alkali salt which can easily be molten and thus lends itself readily to electrolysis, as for instance any other alkali metal halide; I furthermore reserve the right to add any alkali earth halide, as for instance calcium chloride, calcium fluoride etc. in such quantities as may be sufficient to lower the melting point of the electrolyte and thus facilitate the electrolysis.

It is evident from the foregoing that the reduction of the silicate is greatly facilitated by its immersion in the electrolyte through which the little globules of sodium or nebulae of gaseous sodium travel during their upward rise through shaft 3; furthermore the formation of subhalides of the form $R_2C$, where R stands for any alkali metal and C for any halogen, in the electrolyte is a material factor in the reduction of the silicate by an alkali metal generated during the operation of the process and by the same apparatus needed for the operation of same.

The foregoing description shows that my process is a substitute for the old style fusion of ores with sodium carbonate, or compounds having a similar effect, at high temperature, to dissolve the main ingredient in order to bring it into the desired marketable form. The "ores" to be treated may be any of the minerals usually classified as ores in the general sense of the word, or any other compound which contains an element either as its oxide or in such form as to be capable to form an oxide, the same to be of acid reaction to form a soluble salt with the oxide of the metal separated at the cathode of the electric furnace. The elements coming in consideration for the purposes of my invention are for instance titanium, zirconium, thorium, tin, vanadium, chromium, molybdenum, uranium, manganese, and elements of like chemical action.

I also wish to state that it is not absolutely necessary to cause the molten electrolyte to rise within shaft 3 by means of pressure created by the generated chlorine in the gas chamber 12, but I may effect this purpose if dilute chlorine is desired, also by introducing any suitable gas, which is inert to the material of the gas chamber and to the electrolyte as well as to the chlorine through valve 27, or any other entrance device, until the necessary pressure is obtained.

Furthermore I may change parts of the apparatus within a wide range of equivalents known to the art, for instance I may substitute the electrodes shown in the drawings by a bath of liquid lead, whereby neither the phenomena of the electrolysis nor those of my new chemical process per se are greatly changed, though the stratification of the alkali halide electrolyte and that of the formed fusible compounds, for instance sodium silicate and sodium aluminate may bring about some changes without however deviating from the spirit of my invention. Even the direct application of for instance a liquid lead sodium bath produced in some other way, as a source of sodium, will be within the general principle of my new invention.

For completeness' sake it is stated that the alkali carbonates from the electrolyte and from the applied raw material are easily obtained and at a very satisfactory yield by evaporating the solution obtained by filtering off the precipitate of aluminum hydroxide.

Having thus described my invention, what I claim is:

1. The process of manufacturing metallic compounds from ores containing a metal capable of forming an oxide of acid reaction, consisting in immersing the ore in a bath containing an alkali metal, acting with said alkali metal upon the immersed ore generating molten metallic compounds thereby, withdrawing said molten metallic compounds from the bath and separating the metallic compounds from each other by any of the well known ways.

2. The process of manufacturing metallic compounds from ores containing a metal capable of forming an oxide of acid reaction, consisting in immersing the ore in a bath of an electrolyte capable of generating an alkali metal, generating an alkali metal in said bath by electrolysis, acting with said alkali metal upon the immersed ore generating molten alkali metal salts thereby, withdrawing said molten alkali metal salts from the bath and separating the acids forming aforesaid alkali metal salts by any of the usual ways.

3. The process of manufacturing metallic compounds from ores containing a metal capable of forming an oxide of acid reaction, consisting in immersing the ore in a bath of an electrolyte capable of generating an alkali metal by electrolysis, generating an alkali metal in said bath by electrolysis, acting with said alkali metal in the presence of an oxygen containing flux upon the immersed ore generating molten alkali metal salts thereby, withdrawing aforesaid alkali metal salts from the bath and separating the acids forming aforesaid alkali metal salts by any of the well known ways.

4. The process of manufacturing metallic compounds from ores containing a metal capable of forming an oxide of acid reaction, consisting in immersing the ore in a bath of an electrolyte capable of generating an alkali metal by electrolysis, generating an alkali metal in said bath by electrolysis, acting with said alkali metal upon the immersed ore generating molten alkali metal salts thereby, maintaining the level of the electrolyte at the desired height by means of pressure exerted upon the electrolyte, withdrawing the aforesaid alkali metal salts from the bath and separating the acids forming aforesaid alkali metal salts by any of the usual ways.

5. The process of manufacturing metallic compounds from ores containing a metal capable of forming an oxide of acid reaction, consisting in immersing the ore in a bath of an electrolyte capable of generating an alkali metal by electrolysis, generating an alkali metal in said bath by electrolysis, acting with said alkali metal upon the immersed ore generating molten alkali metal salts thereby, maintaining the level of the electrolyte at the desired height by means of pressure created by the gas generated by the electrolysis for the production of the alkali metal, withdrawing aforesaid alkali metal salts from the bath and separating the acid forming aforesaid alkali metal salts by any of the usual ways.

6. The process of manufacturing metallic compounds from ores containing a metal capable of forming an oxide of acid reaction, said process comprising maintaining the level of the electrolyte at the desired height by exerting pressure upon said electrolyte.

7. The process of manufacturing metallic compounds from ores containing a metal capable of forming an oxide of acid reaction, said process comprising generating a gas to exert pressure upon said electrolyte to cause the electrolyte to rise to the desired height.

8. The process of manufacturing metallic compounds from ores containing a metal capable of forming an oxide of acid reaction, said process comprising adding an oxygen containing flux to the electrolyte as a source of oxygen for the reaction.

9. The process of manufacturing aluminum compounds from aluminum ores, consisting in immersing aluminum ore in a bath of a molten alkali metal salts, generating an alkali metal in said bath, acting with the alkali metal upon the immersed aluminum ore, generating molten alkali metal aluminate and alkali metal silicate thereby, withdrawing the aforesaid aluminate and silicate from the bath and separating the alumina and silica from aforesaid aluminate and silicate by any of the well known ways.

10. The process of manufacturing aluminum compounds from aluminum ores consisting in immersing aluminum ore in a bath of molten sodium chloride, generating sodium in said bath, acting with the sodium upon the immersed aluminum ore generating sodium aluminate and sodium silicate thereby, withdrawing the aforesaid aluminate from the bath, and separating the alumina and silica from aforesaid aluminate and silicate by any of the well known ways.

11. The process of manufacturing aluminum compounds from aluminum ores, consisting in immersing aluminum ore in a bath of molten sodium chloride, electrolyzing said sodium chloride generating sodium metal and chlorine thereby, acting with the sodium upon the immersed aluminum ore generating sodium aluminate and sodium silicate, maintaining the level of the sodium chloride at the desired height by causing the chlorine gas to press upon said sodium chloride, withdrawing the molten sodium aluminate and sodium silicate from the bath and separating the alumina from the silica out of aforesaid aluminate and silicate by any of the well known ways.

12. The process of manufacturing aluminum compounds from aluminum ores, consisting in immersing aluminum ore in a bath of molten alkali halide, generating an alkali metal in said bath, acting with the alkali metal upon the immersed aluminum ore in the presence of an oxygen containing flux, generating molten alkali aluminate and alkali silicate thereby, withdrawing alkali aluminate and alkali silicate from the bath, and separating the alumina and silica out of aforesaid silicate and aluminate from any of the well known ways.

13. The process of manufacturing aluminum compounds from aluminum ores, said process comprising the step of maintaining the masses acting upon each other at a temperature reaching the melting point of the alkali aluminate formed by the reaction.

14. The process of manufacturing aluminum compounds from aluminum ores, said process comprising the step of maintaining the masses acting upon each other at a temperature reaching the melting point of the sodium aluminate formed by the reaction.

15. The process of manufacturing aluminum compounds from aluminum ore, said process comprising the step of adding an oxygen containing flux to the reaction mass.

16. The process of manufacturing alkali metal carbonates from ores containing such metals, consisting in acting upon said ores with an alkali metal forming soluble compounds thereby withdrawing said soluble compounds from the reaction mass, dissolving same in water, treating their filtered solution with carbon dioxide thereby causing compounds insoluble in the solution thus treated to precipitate, separating the precipitate from the filtrate, and evaporating said filtrate to dryness.

17. In an apparatus for the manufacture of metallic compounds from ores, the combination of a funnel shaped sink extending at one side into a basin, a shaft resting on the upper rim of the funnel, a gas chamber adjoining said shaft superimposed over the basin like extension of the funnel, the gas chamber communicating with the shaft by means of the sink, a flue surrounding the sink and the shaft, means within the basin and in the lower part of the shaft to electrolyze substances provided within the sink and the lower part of the shaft, means to heat the aforesaid flue, means to discharge gases from the gas chamber, means to feed material into the sink, an exit to withdraw materials from the sink, an entrance to feed materials into the shaft and an exit for gases from said shaft.

JOHN D. GAT.